O. A. PARKER.
AUTOMOBILE WHEEL.
APPLICATION FILED MAR. 17, 1917.
1,333,674.
Patented Mar. 16, 1920.
2 SHEETS—SHEET 1.
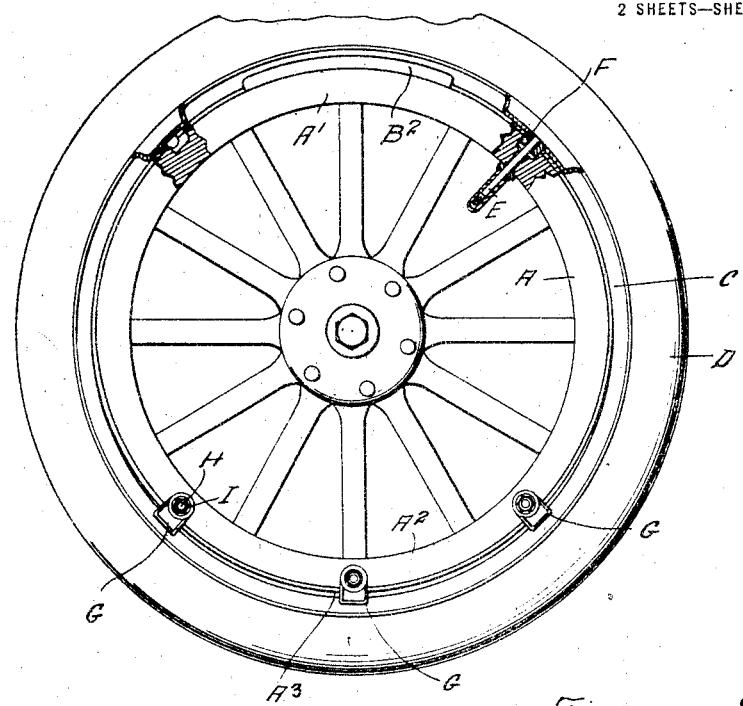
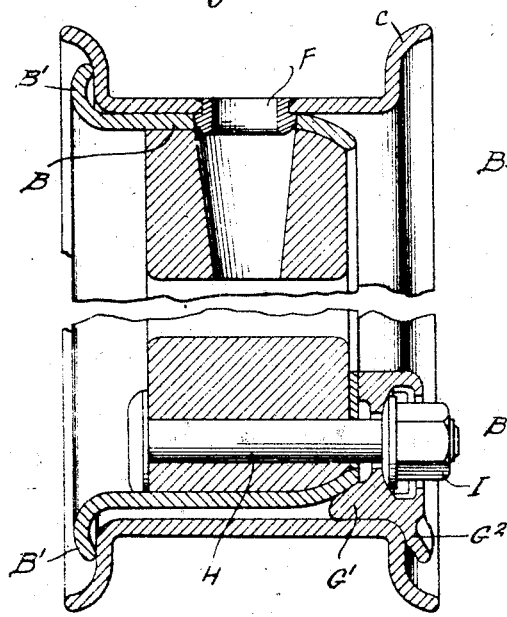
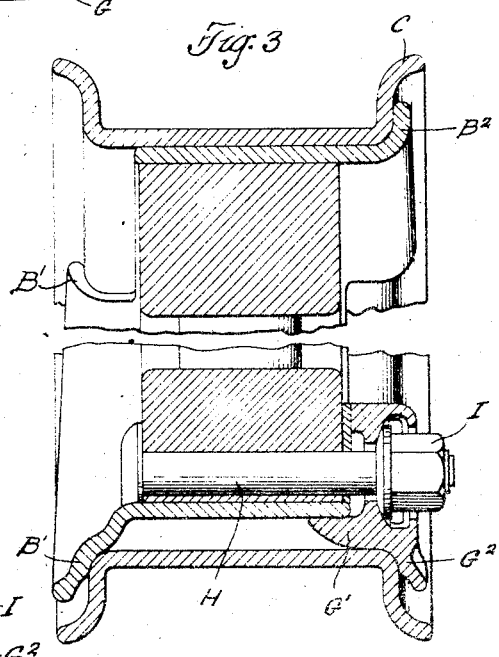
Inventor
Orrel A. Parker

O. A. PARKER.
AUTOMOBILE WHEEL.
APPLICATION FILED MAR. 17, 1917.

1,333,674.

Patented Mar. 16, 1920.
2 SHEETS—SHEET 2.

Inventor
Orrel A. Parker
by Hull Smith Brock & West
Attys.

UNITED STATES PATENT OFFICE.

ORREL A. PARKER, OF CLEVELAND, OHIO.

AUTOMOBILE-WHEEL.

1,333,674.

Specification of Letters Patent.  Patented Mar. 16, 1920.

Application filed March 17, 1917. Serial No. 155,487.

*To all whom it may concern:*

Be it known that I, ORREL A. PARKER, a citizen of the United States, residing at Cleveland, in the county of Cuyahoga and State of Ohio, have invented a certain new and useful Improvement in Automobile-Wheels, of which the following is a full, clear, and exact description, reference being had to the accompanying drawings.

This invention relates generally to automobile wheels and more particularly to the means for or manner of securing the demountable tire carrying rim to the felly of said wheel.

Various means have been devised for securing the rim upon the felly but all, or nearly all of such devices are composed of or embody a number of parts operating upon the rim at a large number of separated points, and great care and skill must be exercised in manipulating these separate devices in order to secure the rim in a true plane and properly centered.

The object of the present invention therefore is to provide a rim fastening means which shall embody and require a minimum number of parts and which will correspondingly eliminate the chances of improperly positioning the rim upon the felly. The invention consists in the novel features of construction hereinafter fully described and pointed out in the claims.

Figure 4:
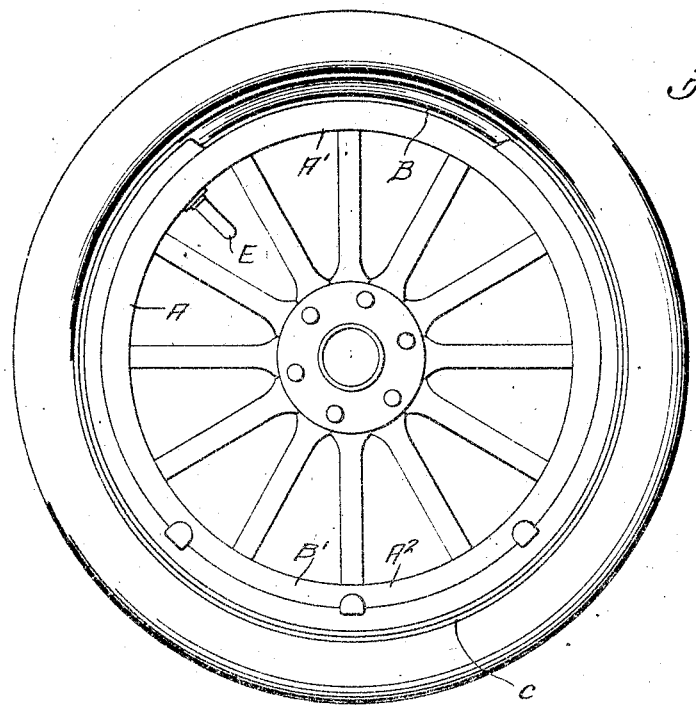
Figure 5:
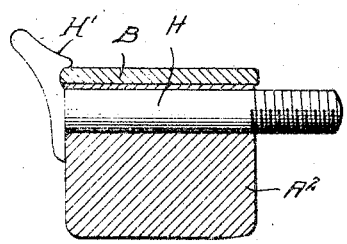

In the drawings forming a part of this specification Figure 1 is a face view of a wheel embodying my invention; Fig. 2 is an enlarged view (broken) on line 2—2 of Fig. 1; Fig. 3 is a similar view showing a slight modification; Fig. 4 is a rear face view of the construction shown in Figs. 1 and 2; and Fig. 5 is a detail section showing a still further modification.

In the practical embodiment of my invention I employ a wheel body A, one-half of the felly A' being concentric and the remaining half $A^2$ slightly eccentric. This eccentricity being produced by removing a portion of the felly, the greatest eccentricity being at the point $A^3$. The wheel thus formed is provided with a felly band B having the inclined or curved flange B' at the inner or back edge thereof, and this felly band is also formed with a short flange $B^2$ along the outer edge at a point opposite the portion of greatest eccentricity, this flange $B^2$ being about one-fifth of the concentric portion of the wheel body. This flange $B^2$ can be left off if desired. The tire carrying rim C is of the usual or any approved construction and when the tire D is arranged thereon the valve stem E will project through the valve stem opening in the rim and also through the valve stem opening in the wheel body. The rim may also be provided with the usual or any approved form of driving lug or dowel F. The rim C is made in the form of a circle as true as it is possible to commercially make the same and when placed upon the wheel body, one-half of said rim will fit closely upon the concentric portion of the wheel body while the remaining portion of said rim will be spaced a slight distance from the eccentric portion of said wheel body, the greatest space being at the point $A^3$ and gradually decreasing in both directions until it reaches a point where the rim and felly band contact.

For the purpose of taking up this clearance and at the same time drawing the rim firmly upon the concentric portion and properly tensioning and positioning the remaining portion of the rim, I provide wedge clips G, preferably at three points only, one being adjacent the point $A^3$ and the others about midway between said point $A^3$ and the diametrically opposite points where the wheel body ceases to be eccentric. These wedge clips G are mounted upon bolts H which are passed through the wheel body and are firmly secured in place by means of nuts I, the wedge portion G' passing between the felly band and rim and the clip portion $G^2$ bearing against the outer edge of the rim so that as the nut is tightened and the wedge clip forced inwardly, the rim will be tensioned and at the same time shifted laterally so as to bring the same into proper axial position and into engagement with the flange B' at the inner edge of the felly band. The upper or concentric portion of the rim and felly band are of course in close contact with each other from the start, and the tensioning and positioning of the lower or eccentric portion serves to firmly bind the upper half of rim upon the concentric portion of the wheel body.

The center wedge can be made somewhat thicker than the side wedge owing to the difference in eccentricity, or all wedges can be made of the same thickness and the felly band slightly depressed at the points where the side wedges will engage.

In operation, in order to place and fasten the rim upon the wheel body, the wheel body is turned so as to bring the concentric portion uppermost and the front flange portion B² at the top. The rim is then placed upon the top of the felly band, the valve stem and driving lugs fitting into their proper openings and recesses and the bottom portion of the rim is then permitted to drop back upon the lower half of the wheel body, the wedges being of course turned inward so as to permit the rim to swing on. The wedge clips are then turned out and the nuts tightened so as to force said wedges into engagement with the lower portion of the rim thereby tensioning said rim and positioning it laterally and at the same time drawing down the upper portion firmly upon the concentric portion of the wheel body. By means of this construction it will be seen that it is only necessary to employ three bolts and wedges thereby eliminating all the remaining fastening devices and making impossible throwing the rim out of plane or off center.

The flange B' is cut away opposite the flange B² as shown in Figs. 2 and 4, and if desired the flange B' can be omitted entirely and the heads of the bolts H can be forged or upset to provide wedges H', as shown in Fig. 5, and against which the rim can be forced by the wedges G.

When two separate dowels are employed as shown in Fig. 1, one recess or slot, in the felly and felly band, must be elongated toward the other one in order to permit the buttoning on of the rim with the two dowels.

Having thus described my invention, what I claim is:—

1. A wheel body having a felly band a portion of which is concentric and the remaining portion eccentric, a demountable tire carrying rim adapted to fit upon the said felly band, one portion of said rim contacting with the concentric portion of felly band and rim fastening means adapted to be inserted between said rim and eccentric portion of the felly.

2. The combination with a wheel body having a felly band one portion of which is concentric and the other portion eccentric, of a demountable tire carrying rim circular in form and adapted to fit thereon and means for simultaneously binding a portion of the rim upon the concentric portion of the felly band and tensioning the remaining portion of said tire carrying rim.

3. The combination of a wheel body having a felly band one portion of which is concentric and the remaining portion eccentric, of a demountable tire carrying rim adapted to fit upon said felly band and a locking element carried by the wheel body and adapted to exert radial pressure upon that portion of the rim opposite the eccentric portion of the felly band thereby binding said rim upon the concentric portion of the felly band tensioning the rim as a whole and also acting laterally to position the tensioned rim upon the felly band.

4. The combination of a wheel body having a felly band, one portion of which is concentric and the remaining portion eccentric, of a circular demountable tire carrying rim adapted to fit upon said felly band and a locking element having a tapering portion adapted to engage said rim at the eccentric portion of the felly band, to tension rim and position it laterally.

5. The combination with a wheel body having a felly band one portion of which is concentric and the other portion eccentric said felly band having a flange at the inner edge thereof and also a flange secured at the outer edge thereof centrally of the concentric portion, of a circular demountable tire carrying rim adapted to fit upon said band, and locking elements having tapering portions adapted to be inserted between the rim and eccentric portion of the felly band whereby one half of the rim is drawn down upon the concentric portion of the band and the remaining portion of the rim is tensioned radially and positioned laterally.

In testimony whereof I hereunto affix my signature.

ORREL A. PARKER.